United States Patent

[11] 3,570,536

[72] Inventors Gordon Richard Walker;
William Murray, Leamington, Spa, England
[21] Appl. No. 638,334
[22] Filed May 15, 1967
[45] Patented Mar. 16, 1971
[73] Assignee Filton Limited
Leamington Spa, Warwickshire, England
[32] Priority May 18, 1966
[33] Great Britain
[31] 22149/66

[54] ROTARY UNION DISTRIBUTOR
5 Claims, 7 Drawing Figs.
[52] U.S. Cl. ................................................... 137/625.11, 251/180
[51] Int. Cl. .......................................................... F16k 11/00
[50] Field of Search............................................137/625.11; 137/625.15, 580; 251/180, 208; 137/625.24

[56] References Cited
UNITED STATES PATENTS
| | | | |
|---|---|---|---|
| 1,948,963 | 2/1934 | Dukes............................ | 137/580x |
| 2,831,651 | 4/1958 | Hutchings..................... | 137/580X |
| 3,079,948 | 3/1963 | Allen.............................. | 137/625.11X |
| 3,246,572 | 4/1966 | Ogilvie........................... | 137/625.24X |

Primary Examiner—William R. Cline
Attorney—Cushman, Darby & Cushman

ABSTRACT: A system for permitting fluid to be sequentially distributed to different operative zones under the control of a distributor comprising a ported disc valve member and at least one cooperating coaxial ported member, the said members being relatively rotatable and arranged so that the fluid will flow in the direction of the axis of the disc valve member in passing from one said member to the other, and means for maintaining the cooperating faces of said members in sealing relationship.

Patented March 16, 1971

Patented March 16, 1971 3,570,536

Patented March 16, 1971
3,570,536
4 Sheets-Sheet 3
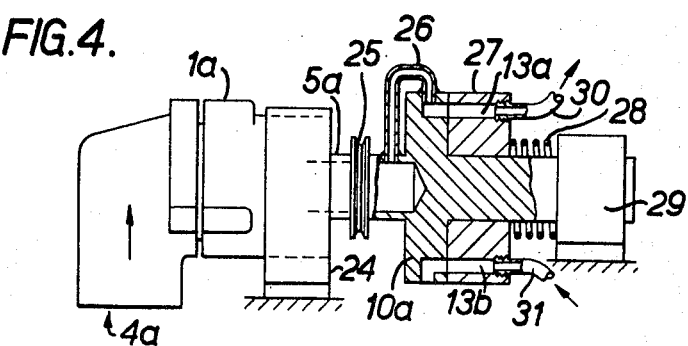
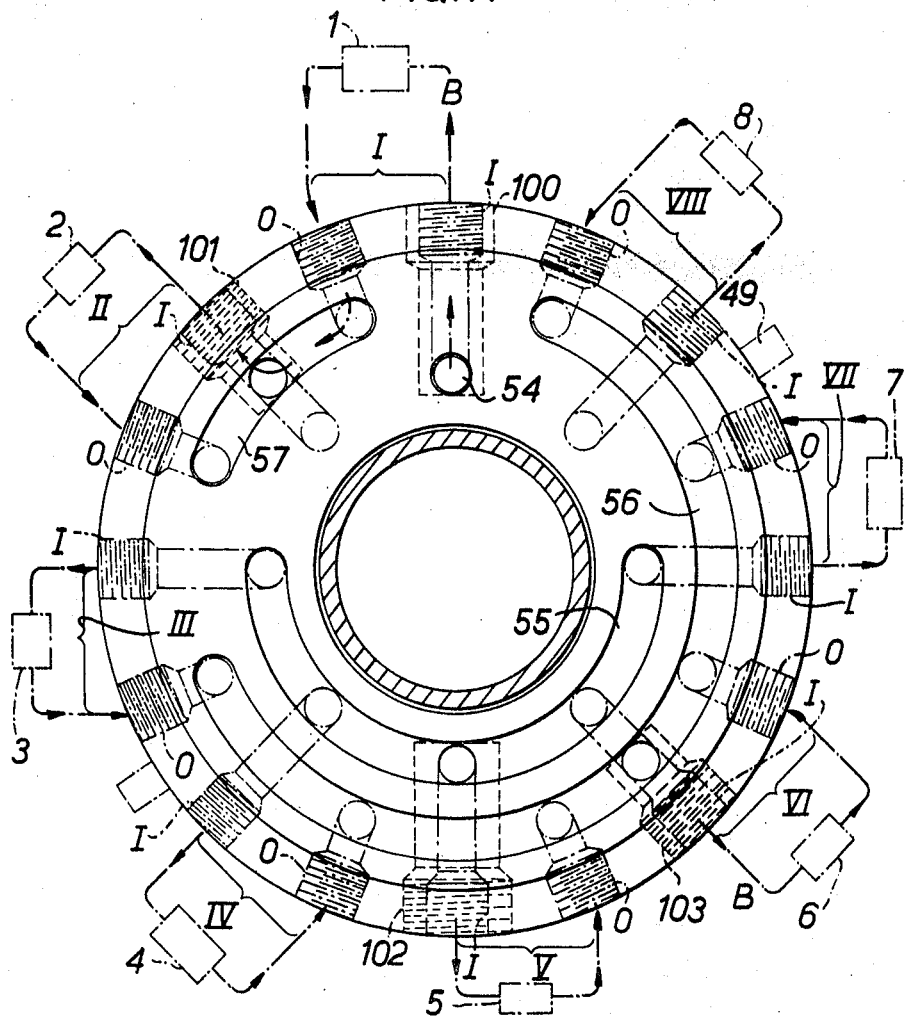

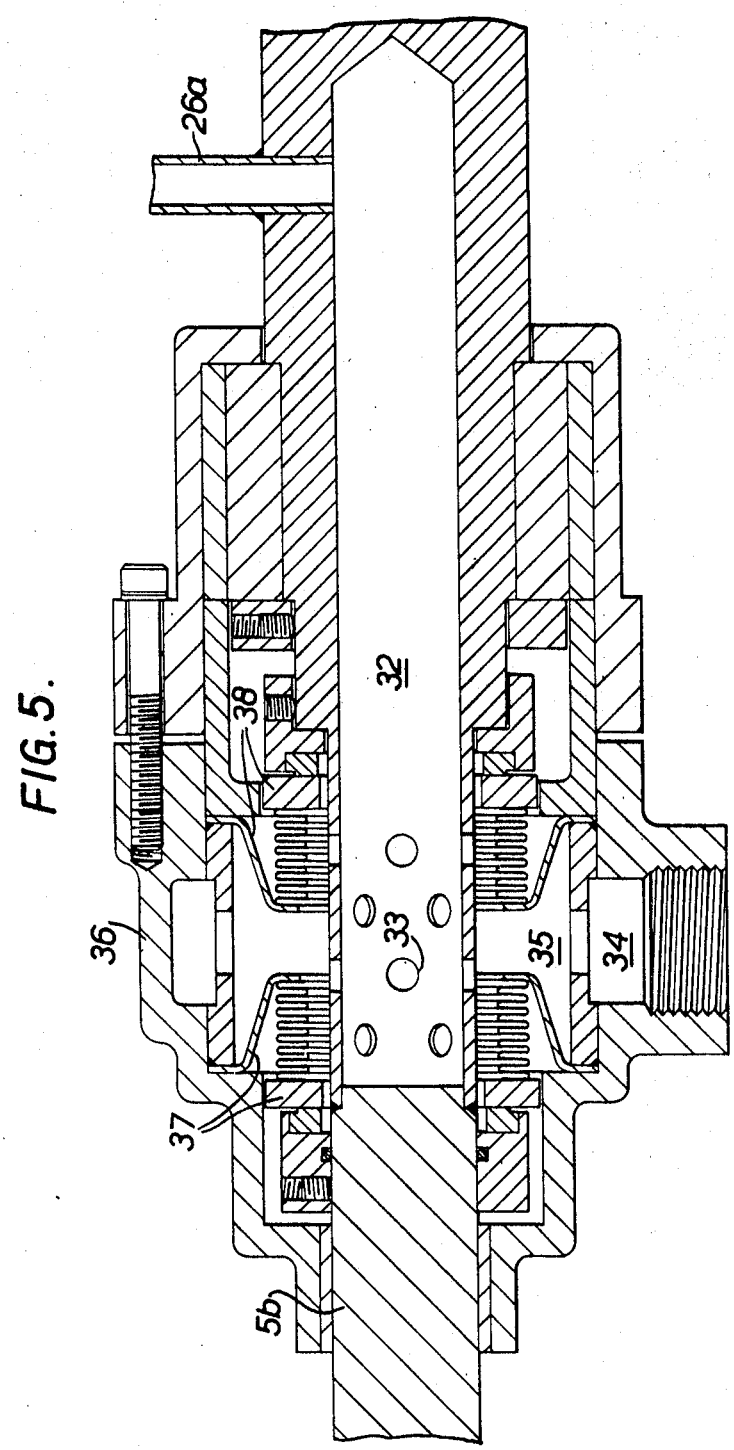

ROTARY UNION DISTRIBUTOR

The present invention relates to a distributor for sequentially distributing fluid to a series of operative zones.

Various forms of such a distributor have been proposed but they have in general comprised relatively rotating members with cooperating cylindrical or conical faces containing the ports for the distribution of the fluid, the fluid passing from the ports in one of the members to the ports in the other member in the radial direction.

According to the present invention a distributor for permitting fluid to be sequentially distributed to different operative zones comprises a ported disc valve member and at least one cooperating coaxial ported member, said members being relatively rotatable and arranged so that the fluid will flow in the direction of the axis of the disc in passing from one member to the other, means being provided for maintaining their cooperating faces in sealing relationship.

Such a distributor is simple and can be produced economically. The cooperating faces of the said members can be made optically flat by relatively simple methods and they can be kept in close contact by spring or like means. Less precision work is necessary to obtain sufficiently close contact between the cooperating faces to prevent unwanted leakage and as compared with cylindrical cooperating faces satisfactory face-to-face sealing contact between the said members can be readily maintained despite wear.

The disc valve member may have one or more ports in the form of an arcuate slot and the quantity of fluid passed determined by the length of the slot in relation to the speed of rotation. Disc valve members with ports of different slot length may be readily interchangeable.

The disc valve member and its cooperating member or members serve as a rotary contact seal ported to control fluid flow and provide a ready means whereby the rate of flow to successive zones can be readily varied in relation to the speed of rotation.

The distributing means according to the invention are well suited in combination with a rotary union of the kind adapted for conveying fluid under pressure to or from a rotary member, and comprising a hollow casing containing a hollow shaft through which the fluid can pass from or to the interior of the casing and the shaft being sealed in relation to the interior of the casing by way of a rotary contact seal, i.e., a seal in which two hard smooth radial faces relatively rotate in contact with one another while maintained in contact by spring, bellows or other suitable means. In such a case the distributor according to the invention can be used to control distribution of the fluid delivered under pressure by way of the hollow shaft.

The distributing means are suitable for various purposes, e.g., for apparatus controlled by pneumatic or hydraulic cylinders. The disc valve member may rotate and the said cylinders be connected to the cooperating ported member which is held stationary, or the disc valve member may be held stationary and the cooperating ported member and the cylinders rotate.

According to one embodiment of the invention a rotary union as aforesaid comprises, coaxially within the said hollow shaft, a nonrotating rod or tube carrying the disc valve member which has an aperture or apertures which during rotation of the shaft will periodically communicate with offcenter passages in the shaft which in turn communicate with rotary devices to be fluid actuated.

The operative aperture in the disc may be an arcuate slot and the shaft may be formed in two parts, e.g., one end spigoted into the other, and one rotatably supported in the casing of a rotary union and having a central bore through which the said rod or tube passes with clearance so as to form an annular passage and the other having one or more passages leading into an end wall of such part which forms a seating for the valve disc.

The aforesaid annular passage may expand into a chamber between the annular passage and the valve disc member. The latter may be detachably keyed to the rod or tube and held against the said seating by spring means.

According to another embodiment of the invention, the valve disc member is mounted to rotate with the hollow shaft and has an arcuate slot which during rotation of the shaft will periodically communicate with offcenter axial passages in a nonrotatable member, which passages are connected to devices to be fluid operated or controlled.

Each passage may register with the aforesaid slot for a period of time dependent upon the speed of rotation of the shaft and the length of slot can be chosen to permit the requisite flow.

According to another embodiment, the disc valve member is nonrotatably arranged with respect to one of two relatively rotatable ported members and axially between said ported members, one of said ported members having fluid supply and return ports and the other of said ported members having successive pairs of inlet and outlet ports for a plurality of operating zones, the disc valve member controlling communication between the said supply and inlet ports and the said outlet and return ports. The disc valve member may have a plurality of arcuate slots at different radial distances from its center of rotation and these slots may be different length. The supply and return ports may be arranged to permit hot and cold water to be supplied in succession to each operating zone. Such a distributor may be employed in system in which each said zone forms a moulding zone and first hot water will be passed to each mould, then hot water extracted, then cold water so passed and finally extracted, the one ported member having a single hot water supply port and a single hot water return port and a single cold water supply port and a single cold water return port and the other member having pairs of inlet and outlet ports to and from the moulds at least equal in number to the number of ports of the first member.

A circular system of rotating moulds can in this way be each subjected to such treatment in one revolution of the series.

In order that the invention may be the more clearly understood reference is hereinafter made to the accompanying drawing, illustrating one embodiment of rotary union according to the invention, and in which:

FIG. 4 shows a modified arrangement where the valve disc rotates with shaft;

FIG. 5 shows a modified form of union with a valve arrangement according to FIG. 4;

FIG. 7 is a section along line C-C of FIG. 6.

The arrangements illustrated in FIGS. 1 to 5 are particularly advantageous where mechanical operations are to be performed through the medium of the fluid passed through a rotary union. For example the piston rods of a rotatable system of piston-cylinder devices may be operated in a desired sequence under the control of the valve and the speed of the shaft to operate mechanical parts, electric switches or other means, or in the second embodiment a stationary system of piston-cylinder devices may be controlled by the valve and the speed of the shaft for the operation of such means. Provision may be made to exhaust the said devices to atmosphere where a pneumatic medium is the operating fluid or to return the fluid through the rotary union, e.g., where a hydraulic medium is used.

Figure 1:
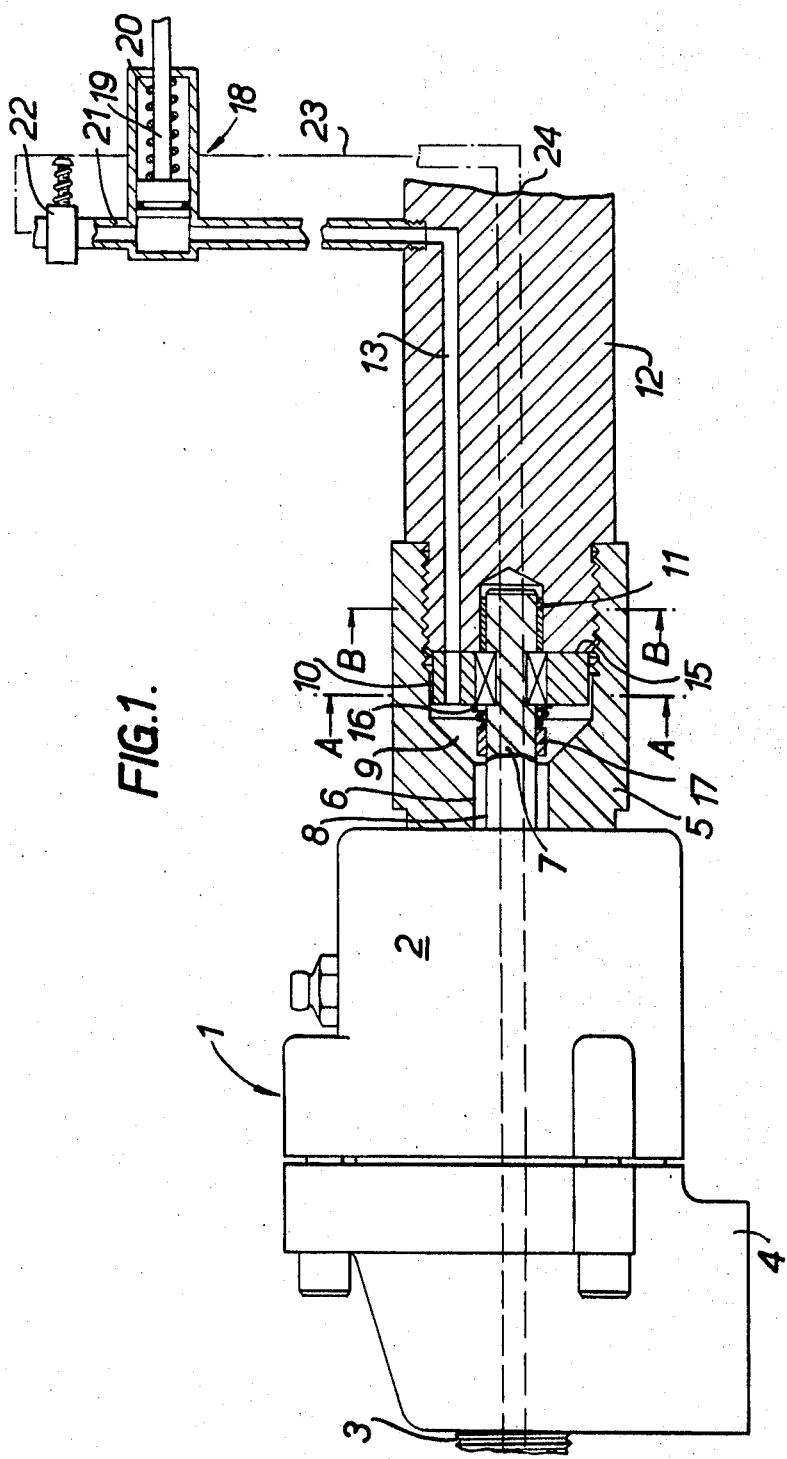
FIG. 1 is a sectional elevation.
Figure 2:
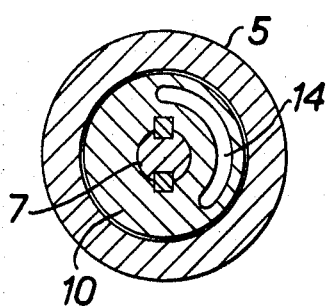
FIGS. 2 and 3 are cross-sectional views on the lines A-A and B-B.
Figure 3:
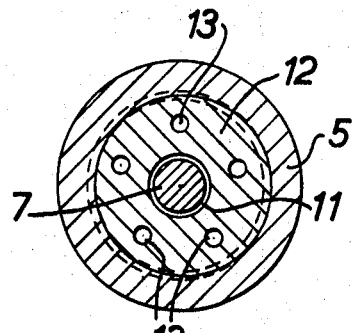

Referring now to FIG. 1, the union 1 is provided with a casing 2 which can be suitably fixed, e.g., at 3, and provided with an air inlet 4. The casing rotatably supports, e.g., by means of suitable ball and/or roller bearings one part 5 of a rotatable shaft which is provided with an axial bore 6. A rotary contact seal (not shown) is provided between the shaft and the casing. A rod 7 passes through this bore and is secured to the casing at the left-hand end thereof in relation to the drawing, the rod being so proportioned in relation to the said bore that an annular passage 8 is formed around the rod, this passage being in communication with the interior of the casing 2 and the said inlet 4 and expanding into a chamber 9 containing a disc valve 10 which is detachably keyed to the rod 7 so as to be nonrotatable in relation to the rod. The end of the rod supports by way of a suitable sleeve bearing 11 the other part 12 of the shaft which is spigoted into the end of the first part 5 and is provided with a number of offcenter longitudinal passages 13 each of which in the illustrated form opens radially of the shaft. The disc valve 10 (see FIG. 2) is formed with an arcuate slot 14 and is pressed against the seat forming end 15 of the shaft part 12 by a spring 16 bearing at its other end against a split ring 17 secured to the rod.

As the shaft rotates the passages 13 will successively come into registration with one end of the slot in the valve and remain in registration with the slot for a period dependent upon the length of the slot and the speed of rotation of the shaft. The length of slot may be predetermined as desired, e.g., may extend one-fifth, two-fifths, or three-fifths round the pitch circle thereof and one disc may be readily changed for another having a different dimension of slot.

The fluid is allowed to flow from the radial parts of the passages to the rotary apparatus, e.g., to cylinders thereof for pneumatic operation and one or more passages may be connected to a cylinder.

With a predetermined disc valve, the control of the airflow past the valve is thereafter dependent upon the rotational shaft speed and the speed of operation may be controlled thereby.

For example each of the passages 13 may be connected to a piston-cylinder device 18 of a rotary system of such devices so that dependent upon the relationship between the passages 13 at the end associated with the arcuate slot of the valve 10 and the speed of rotation of the shaft periodic displacement of the piston 19 of each device 18 will occur against the pressure of a spring 20 so to cause the piston to perform some mechanical operation such as to close a fixture or eject a component. Exhaust may be by way of an outlet pipe 21 containing a valve 22 operated, e.g., from a stationary part of the machine, to atmosphere where air is the operating fluid. Alternatively, e.g., in the case where the operating fluid is a hydraulic medium a return from the cylinder may be as indicated in the dotted line 23 to a common exhaust return 24, extending through the shaft 12 and the coaxial fixed rod 7.

In the apparatus shown in FIG. 4 particularly designed for a pneumatic system the rotary union 1a containing the rotary contact seal is provided with an air inlet 4a and is supported on bracket 24 and the hollow shaft 5a is driven by way of a variable speed gear 25. The disc valve 10a is in this instance fixed to the shaft 5a for rotation therewith and receives the pneumatic medium from the interior of the shaft by way of a tubular connection 26. 27 is a nonrotatable member with passages 13a and held up to the rotary disc valve by way of a spring 26 reacting with the support bearing 29 for the shaft. The member 27 is suitably held against rotation. In this case a supply pipe 30 leads to a cylinder, e.g., of a piston-cylinder device such as is shown in FIG. 1, and exhaust of the cylinder may be either directly or through pipe 31 to atmosphere by way of passage 13b and the valve slot. A plurality of such passages 13a, 13b may be provided in the member 27.

In the embodiment shown in FIG. 5, a tube connection 26a is shown similar to that shown in FIG. 4 and the valve mechanism may be as shown to right of FIG. 4. The purpose of FIG. 5 is to show an alternative construction of the rotary (longitudinal section) wherein the shaft 5b (corresponding to 5a in FIG. 4) is solid at the driven end (its left-hand end in the drawing) and is hollow at 32. It is provided with a number of ports 33 in its hollow part and the air or hydraulic medium is fed by way of inlet 34 into a chamber 35 in a casing 36 which is sealed at each end by a bellows contact seal 37, 38 respectively.

Figure 6:
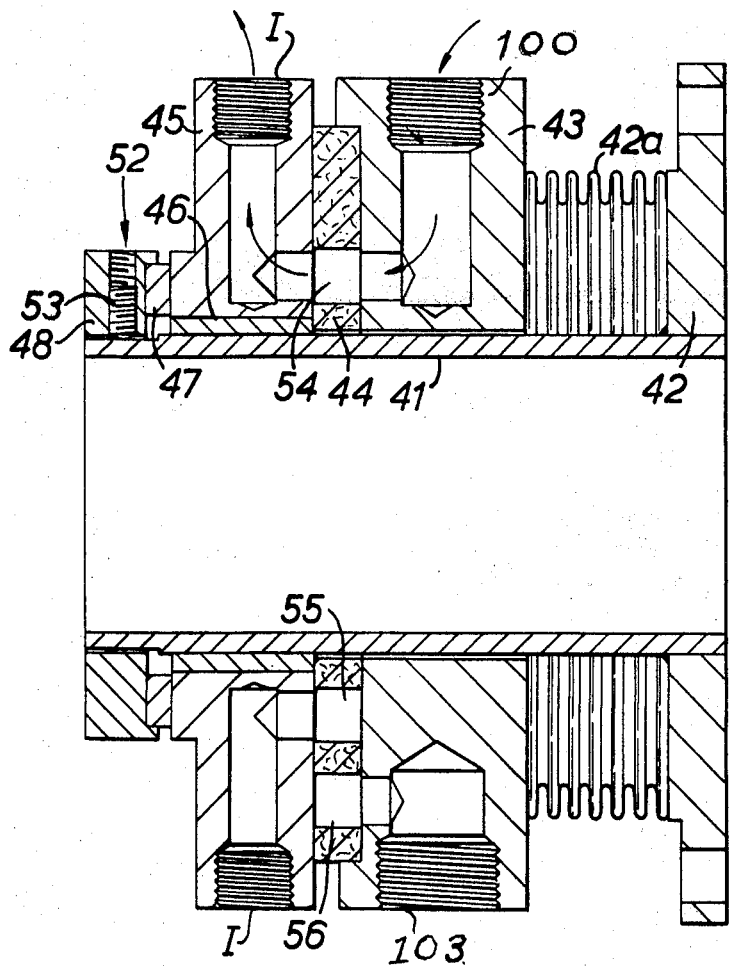
FIG. 6 is a sectional elevation of yet another embodiment of the invention on the line B-B of FIG. 7.

The apparatus shown in FIGS. 6 and 7 comprises a series of mould stations to which hot and/or cold water can be delivered and/or extracted under the control of the valve.

A ported ring 45 and journal bearing 46 rotate and are driven in any suitable manner, e.g., by way of the torque pin 49 (FIG. 7). The central shaft or tube 41 carries a collar 42 to which a bellows 42a is welded, brazed, glued or otherwise secured and the disc valve 44 is secured to the ported fixed ring 43. The contacting faces of the rotary ported ring 45 and the disc valve 44 are kept in sealing contact by the axial thrust of the bellows 42a and this thrust is determined by the spacing between the collar 42 and the fixed ring 43. Adjustment of the spacing is accomplished by a thrust bearing assembly 52 having a screwnut 48 threaded onto the end of the shaft 41 remote from the collar 42 so as to act on thrust bearing 47 disposed between the nut 48 and the ring 45 by a grub screw 53. The valve disc 44 has one hole 54 and three arcuate slots 55, 56, 57 and the proportions and arrangement of the slots and of the ports being variable to suit the purpose of the apparatus.

In the form illustrated there are eight moulds 1 to 8 permanently connected to the ported ring 45 with supply and return pipes. There are four permanent connections to the fixed ring 43, one hot water supply port 100 and one hot water return port 101 and one cold water supply port 102 and one cold water return port 103. The eight moulds are disposed at 45° stations on a rotary table and each is connected to a supply port I on the rotary ported ring 45 and to a return port O on the said ring.

At station I, hot water is supplied via supply port 100 through hole 54 in the valve 44, port I, in the rotary ported ring 45 and the mould and extracted return port O in he rotary ported ring 45, slot 57 in the valve and hot water return port 101.

At station II, hot water supply is cut off by the valve and the hot water is extracted from the mould through the slot 57 in the valve and the hot water return 101. The mould is now hot and dry.

At station III, cold water is supplied and extracted. It enters through supply port 102, passes via slot 55 to the inlet port I, through the mould back through outlet port O and via slot 56 back to the cold water return (discharge port) 103.

Similarly at stations IV, V, VI and VII, cold water is supplied and extracted, entering through port 102, passing via slot 53 to the inlet port I, through the mould, back through the outlet port O and via slot 56 to the cold water return port 103.

At station VIII, the mould is cut off from the hot and cold water supply by the valve and cold water is extracted from the mould via port O, slot 56 and the cold water return port 103. The mould is now cold and dry.

The moulds pass successively through the said stations and receive the like treatment.

Thus during each full rotation of the parted ring 45 a mould is heated, extraction completed, cooled in successive stations and finally cleared of cold water.

In any of the aforesaid embodiments the member or each member cooperating with the disc valve member may be provided with a removable or interchangeable seat component.

We claim:

1. A rotary union adapted to distribute fluid sequentially to different outlets, the union comprising a casing and a hollow shaft rotatable within the casing, the casing having an inlet port, means within the casing for sealing the shaft with respect to the casing but permitting fluid passage between the inlet port and the interior of the hollow shaft, a first member in the form of a disc means being coaxial with the hollow shaft and having at least one port defining a fluid outlet from said hollow shaft, a second member being coaxial with the hollow shaft and having a plurality of individual fluid outlet ports, one of the first and second members being continuously rotatable with the shaft relative to the other member, the first and second members being arranged so that on rotation of the shaft the fluid outlet ports of the second member are successively registrable with the fluid outlet port or ports of the first member whereby fluid flows from the interior of the shaft axially through the port or ports of the first member sequentially into the ports of the second member, and means for maintaining adjacent faces of the first and second members in sealing relation with each other.

2. A rotary union according to claim 1, in which a rod passes through the hollow shaft and is fixed to the casing, the first member being nonrotatably arranged on the said fixed rod, the hollow shaft having an extension externally of the casing which forms said second member.

3. A rotary union according to claim 2, in which the face of the first member is spring urged against a seating face formed on the shaft extension.

4. A rotary union according to claim 1, in which the first member is arranged to rotate with the hollow shaft and the second member is a nonrotatable member yieldingly urged against said first member into sealing relationship thereto, and means placing the interior of the first member in fluid communication with the interior of the hollow shaft.

5. A rotary union according to claim 4, comprising a shaft-rotating gear between the casing and the first member, the first member being arranged externally of the casing.